J. C. UDELL.
SIGNAL FOR VEHICLES.
APPLICATION FILED APR. 18, 1917.
1,283,983.
Patented Nov. 5, 1918.
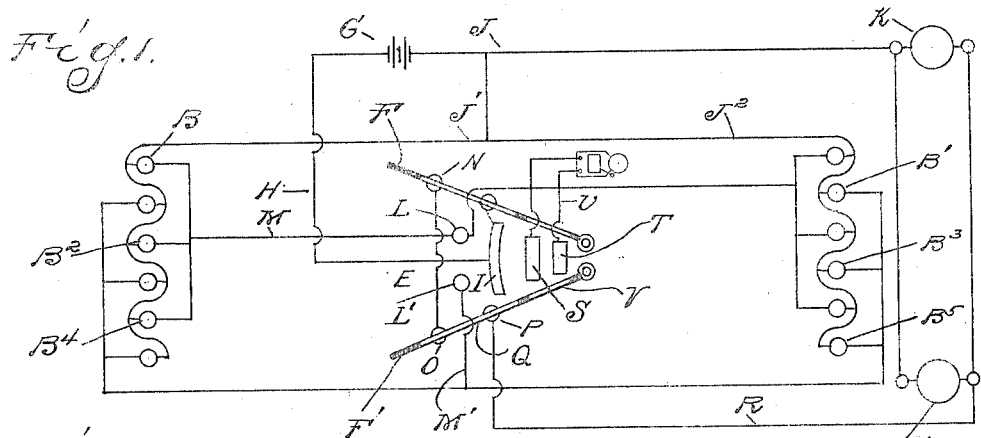
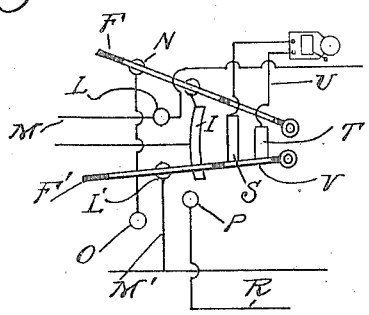
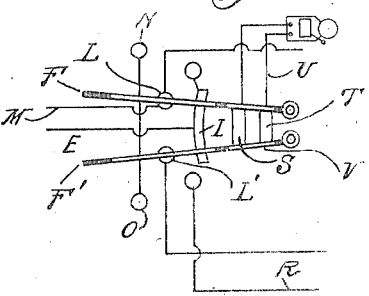
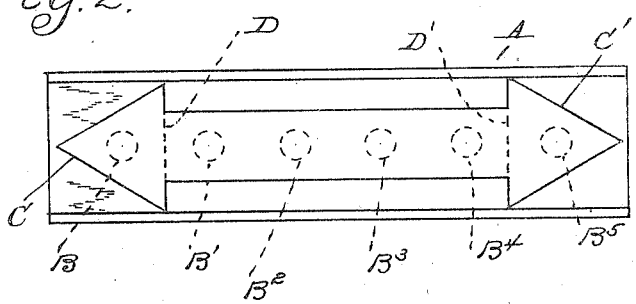
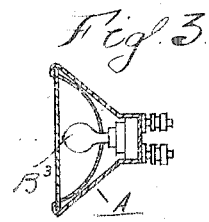
Inventor
Joseph C. Udell
By Whittemore Hulbert & Whittemore
Attorneys

UNITED STATES PATENT OFFICE.

JOSEPH C. UDELL, OF FLINT, MICHIGAN.

SIGNAL FOR VEHICLES.

1,283,983.  Specification of Letters Patent.  Patented Nov. 5, 1918.

Application filed April 18, 1917. Serial No. 162,845.

*To all whom it may concern:*

Be it known that I, JOSEPH C. UDELL, a subject of the Emperor of Austria-Hungary, residing at Flint, in the county of Genesee and State of Michigan, have invented certain new and useful Improvements in Signals for Vehicles, of which the following is a specification, reference being had therein to the accompanying drawings.

The invention relates to signal devices designed for use upon vehicles and adapted to indicate an intended change, such as turning in either direction or stopping. It is the object of the present invention to effect a clear indication by a comparatively simple construction, and further to simultaneously control the lights of the vehicle as hereinafter set forth.

In the drawings:

Figure 1 is a diagram of the apparatus;
Fig. 2 is an elevation of the indicator;
Fig. 3 is a cross section therethrough;
Figs. 4 and 5 are diagrams showing different positions of adjustment.

The essential signals are,—first, an intended stop; second, a turn to the right; and third, a turn to the left. It is most important to indicate these changes to a vehicle following in the rear, but it is also advantageous to indicate the change to a vehicle in front. I therefore preferably employ two duplicate devices, one arranged in the rear and the other at the front of the vehicle, in which like indications are simultaneously made. As shown, the indicator comprises a casing A having arranged therein a series of electric lights B B', etc. The front of the casing is transparent or translucent, and is also preferably formed to display a double-headed arrow C C' when all of the lamps are illuminated. The interior of the casing is, however, divided by partitions D D' arranged between the central portion and the end portions, which display the heads of the arrows so that the rays from the lamps in the central portion will not extend or illuminate the end or head portions. The lamps are also divided into two series in different electrical circuits, one series being constituted by the lamps B $B^2$ $B^4$ and the other by the lamps B' $B^3$ $B^5$. The lamps B and $B^5$ are in the opposite end portions of the casing and respectively illuminate the opposite head portions C and C' of the arrow, while the lamps B' and $B^4$ are in the central or stem portion of the arrow. Thus if the series B $B^2$ $B^4$ is illuminated an arrow pointing to the left will be displayed, while the illumination of the series B' $B^3$ $B^5$ will display an arrow pointing to the right. If all of the lamps are illuminated a double-headed arrow is displayed which is the indication for a stop.

The electric circuits are so arranged that the corresponding lamps of the forward and rear indicator will be simultaneously operated. For controlling these circuits I preferably employ a switch E having two levers or operating members F and F', one controlling the signals for turning to the right and the other the signals for turning to the left. Where the vehicle is provided with intense headlights a turning of the vehicle will throw the light temporarily to the opposite side of the road so as to have a blinding effect on any one coming from the opposite direction. I therefore preferably provide an automatic control by which when the turning signal is displayed the headlights are turned off or dimmed, being restored again to full brightness when the signal is returned to normal.

As shown in the diagram Fig. 1, the arrangement of the electrical circuits is as follows: From the battery or electrical generator G a lead H extends to a contact I of the switch E, and a lead J from the opposite pole of the battery extends to one terminal of each of the headlights K and K', and also through the branches J' and $J^2$ to one terminal of each of the electric lamps in each of the indicators. The switch E is provided with contacts L and L', which are connected to conductors M and M' leading to each of the indicators, the conductor M being connected with the series of lamps B $B^2$ $B^4$ in each of the indicators and the conductor M' being connected to the series of lamps B' $B^3$ $B^5$. The contacts L and L' are so positioned in the switch E that the levers F and F' are separated therefrom in normal position, but when either one of said levers is adjusted into the position shown in Fig. 4, an electrical connection is established between the respective contacts L and L' and the contact I. This will establish an electric circuit from the battery G through the conductor H, contact I, lever F or F', contact L or L' and connection M or M', to one or the other of the two series of lamps. As all of the lamps in each indicator have one terminal connected to a common conductor J' or J², which returns to the opposite pole of the battery G, an electrical circuit will be established illuminating one or the other of the two series. If both levers F and F' are simultaneously operated all of the lamps of both series will be illuminated, which will display the stop signal.

The simultaneous control of the headlights is effected by additional contacts N O and P in the switch E, which are so arranged that in the normal position of the levers F and F' an electrical circuit is established through the headlights K and K', but the adjustment of either of said levers will break the circuit. Thus specifically the circuit established through the conductor H to the contact I and from the latter through the lever F to the contact N which is electrically connected to the contact O. The lever F' is provided with a bridge member Q, which in the normal position of the lever F' connects the contacts O and P, and the contact P is connected by a conductor R to the opposite terminal of each of the lamps K and K'. Thus it will be understood that movement of either one of the levers F or F' will break the lamp circuit, which can only be reëstablished by the restoration of the levers to normal position. This specific construction of switch and arrangement of electrical connections is not, however, essential to my invention, which may be embodied in various specific constructions.

In the use of my invention, whenever the driver of the vehicle desires to turn to the right adjustment of the lever F' from its normal position, shown in Fig. 4, will illuminate the series of lamps B' B³ B⁵ in each of the indicators. The lamps B' and B³ illuminate the stem portion of the arrow and the lamp B⁵ the pointed head portion of the arrow, so that the direction of turning is clearly indicated both front and back. If, on the other hand, the driver is to turn to the left, a similar manipulation of the lever will illuminate the series of lamps B B² B⁴, the lamp B illuminating the pointed head of the arrow, which indicates the direction of turn. The shields D and D' prevent the illumination of the heads C and C' when the lamps B and B⁵ are not in operation, and consequently only one direction is indicated by the manipulation of each of the levers; but where both levers are simultaneously operated the double-headed-arrow will indicate a stop. As has been stated, the manipulation of either one of the levers F or F' separately or together will break the electrical circuit for the headlights, so as to extinguish or dim said lights while turning, but as soon as the levers are restored to normal position the headlights are again illuminated.

When a change is made in the direction of the vehicle it is desirable to sound a warning. I have therefore provided a switch with automatic means for sounding a horn or other signal, which as shown comprises a pair of contacts S and T which are connected to conductors of an alarm circuit U. Each of the switch levers F and F' is provided with a coöperating contact V, which when either lever is in position for displaying the turning signal will bridge between the contacts S and T and close the alarm circuit.

What I claim as my invention is:

1. In an electrical signaling device for vehicles, the combination with a headlight, of a plurality of indicator lights for respectively indicating opposite directions of movement, and controlling means for said indicator lights also controlling said headlights.

2. In an electrical signaling device for vehicles, the combination with a headlight, of a plurality of indicator lights for respectively indicating different directions of movement, separate means for controlling each of said indicator lights, and associated means for controlling said headlight by either or both of said separate controlling means.

3. In an electrical signaling device for vehicles, the combination with a headlight, of a plurality of electrically-operated indicators for respectively indicating opposite directions of movement, and means for separately controlling each of said indicators and simultaneously controlling said headlight.

4. In an electrical signaling device for vehicles, the combination with a headlight, of a plurality of indicator lights for respectively indicating opposite directions of movement and for indicating a stop when simultaneously operated, and separate means for controlling said indicator lights, each simultaneously controlling said headlight.

5. In an electrical signaling device for vehicles, the combination with a headlight, of a plurality of indicator lights for respectively indicating opposite directions of movement, and separate controlling means for the respective indicator lights, each adapted when manipulated to cut out said headlight.

6. In an electrical signaling device for vehicles, the combination with a headlight and a signal for indicating opposite directions of movement, of means operating upon the manipulation of either of the signals for cutting out the headlight.

7. In an electrical signaling device for vehicles, an indicator comprising a plurality of alined and interspersed series of electric lights, separate means for controlling each of said series, and means illuminated by the respective series for indicating the direction of movement.

8. In an electrical signaling device for vehicles, an indicator comprising an alined and interspersed series of electric lights, cooperating for illuminating thereby a double-headed arrow, and means for preventing the illumination of more than one of the heads of said arrow by each of the series.

9. In an electrical signaling device for vehicles, an indicator comprising alined and interspersed series of electric lights together illuminating a double-headed arrow, the heads of said arrow being respectively illuminated by one of the lamps of each series, and shields for preventing the illuminating of said heads by the other series.

10. In an electrical signaling device for vehicles, a pair of indicators respectively at the front and back of the vehicle, each comprising two independent series of electric lights which together illuminate a double-headed arrow, the corresponding series in each of the indicators being connected in the same electric circuit, separate means of controlling said series, and means for preventing the illumination of the heads of said arrows by other than their respective series.

11. In an electrical signaling device for vehicles, the combination with a headlight and signals for respectively indicating opposite directions of movement, of means operating upon the manipulation of either of said signals for cutting out the headlight and sounding an alarm.

In testimony whereof I affix my signature.

JOSEPH C. UDELL.